Figure 1:
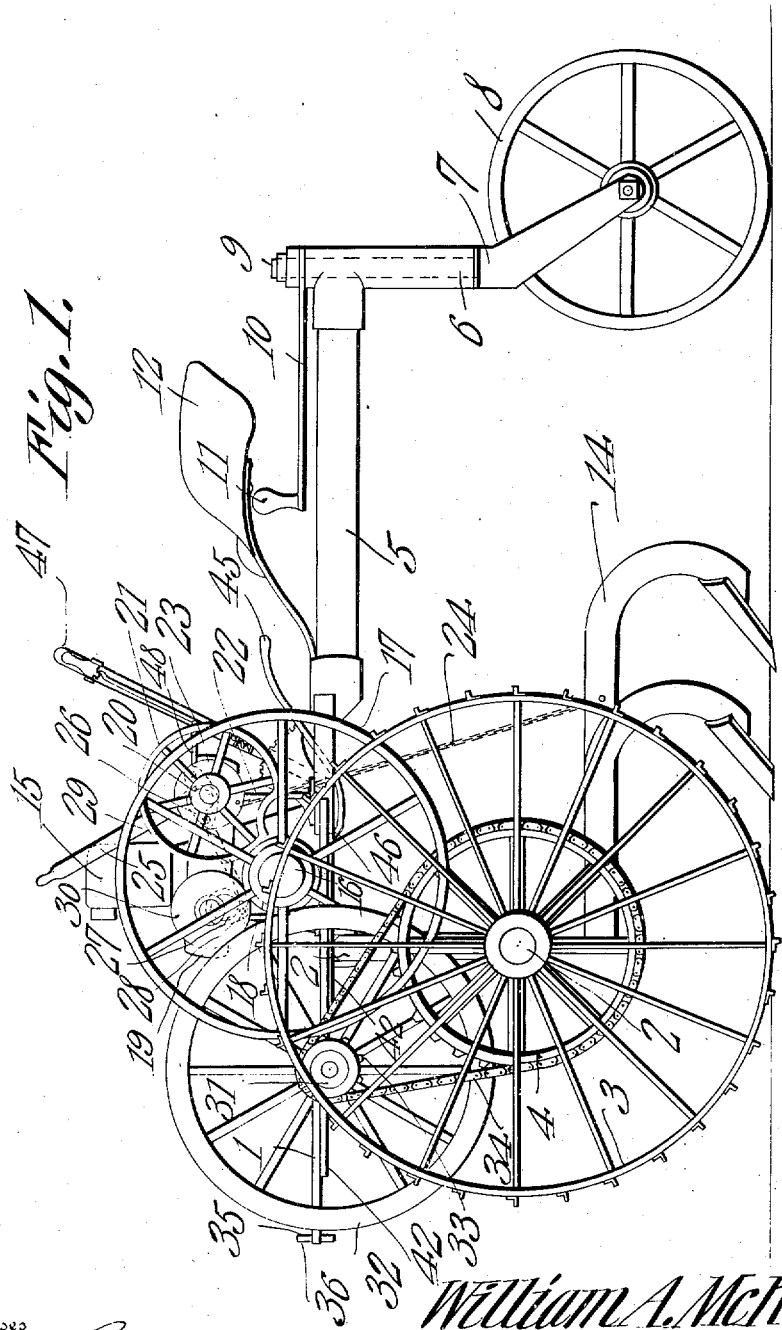

W. A. McKINNEY.
DRIVING MECHANISM.
APPLICATION FILED SEPT. 27, 1909.

956,721.

Patented May 3, 1910.
4 SHEETS—SHEET 1.

W. A. McKINNEY.
DRIVING MECHANISM.
APPLICATION FILED SEPT. 27, 1909.

956,721.

Patented May 3, 1910.
4 SHEETS—SHEET 4.

Witnesses

Inventor
William A. McKinney,
By C. A. Snow & Co.
Attorneys

UNITED STATES PATENT OFFICE.

WILLIAM A. McKINNEY, OF GAINESVILLE, GEORGIA.

DRIVING MECHANISM.

956,721.  Specification of Letters Patent.  Patented May 3, 1910.

Application filed September 27, 1909. Serial No. 519,828.

*To all whom it may concern:*

Be it known that I, WILLIAM A. McKINNEY, a citizen of the United States, residing at Gainesville, in the county of Hall and State of Georgia, have invented a new and useful Driving Mechanism, of which the following is a specification.

This invention has relation to driving mechanism and it consists in the novel con struction and arrangement of its parts as hereinafter shown and described.

The object of the invention is to provide a comparatively light driving mechanism for a tractor especially adapted to be used for carrying cultivator beams and in which the parts are so arranged that the beams may be raised and lowered at will and the tractor may describe short turns and moves in a forward or rearward direction. Also means are provided for steering the tractor as it moves along its course. These capabilities are essential in such a machine in order that a growing crop may be effectually and quickly cultivated without being broken down or otherwise damaged and especially are these features desirable where the field of operation is limited.

With the above object in view the tractor includes the platform or frame mounted upon an arched axle to the ends of which are journaled traction wheels. A beam extends rearwardly from the frame or platform and at one side thereof and a dirigible wheel is located at the rear end of the said beam. An engine is mounted upon the platform and distinct transmission devices are located at the sides of the frame for transmitting motion from the engine shaft to the respective traction wheels. These transmission devices are susceptible of being operated whereby the said traction wheels are caused to turn in a forward or rearward direction and also the said transmission devices may be operated to cause them to raise or lower the cul tivator beams which are attached to the arch axle. In addition to the transmission devices above mentioned means are provided for simultaneously or singly locking or checking the traction wheels while the en gine continues to run and by this means it will be seen that the tractor may be stopped and locked at a state of rest or one wheel thereof may be stopped and locked at a state of rest while the other wheel is permitted to turn upon its axis thereby causing the tractor to describe a short turn upon the ground.

Figure 2:
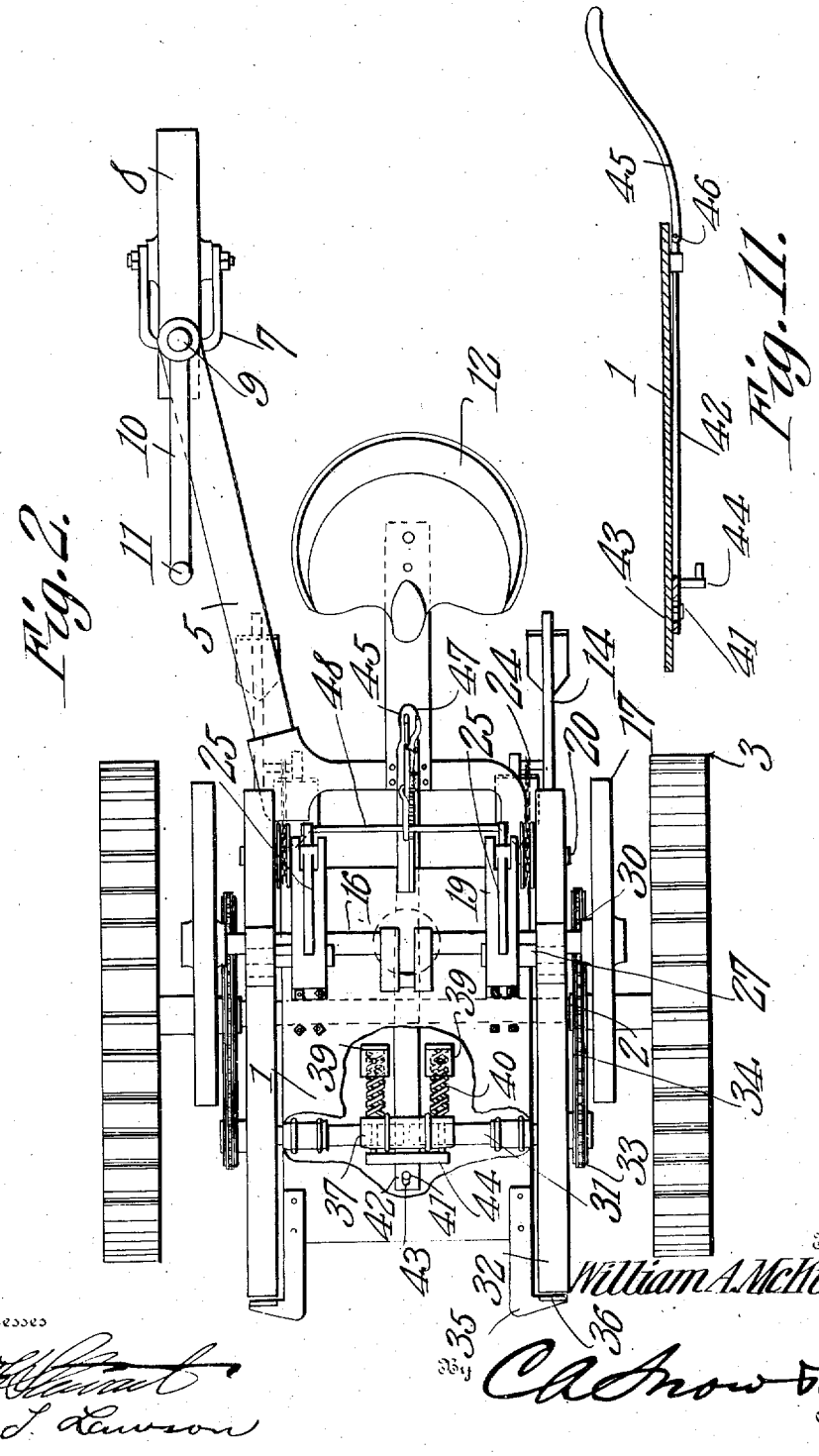
Figure 3:
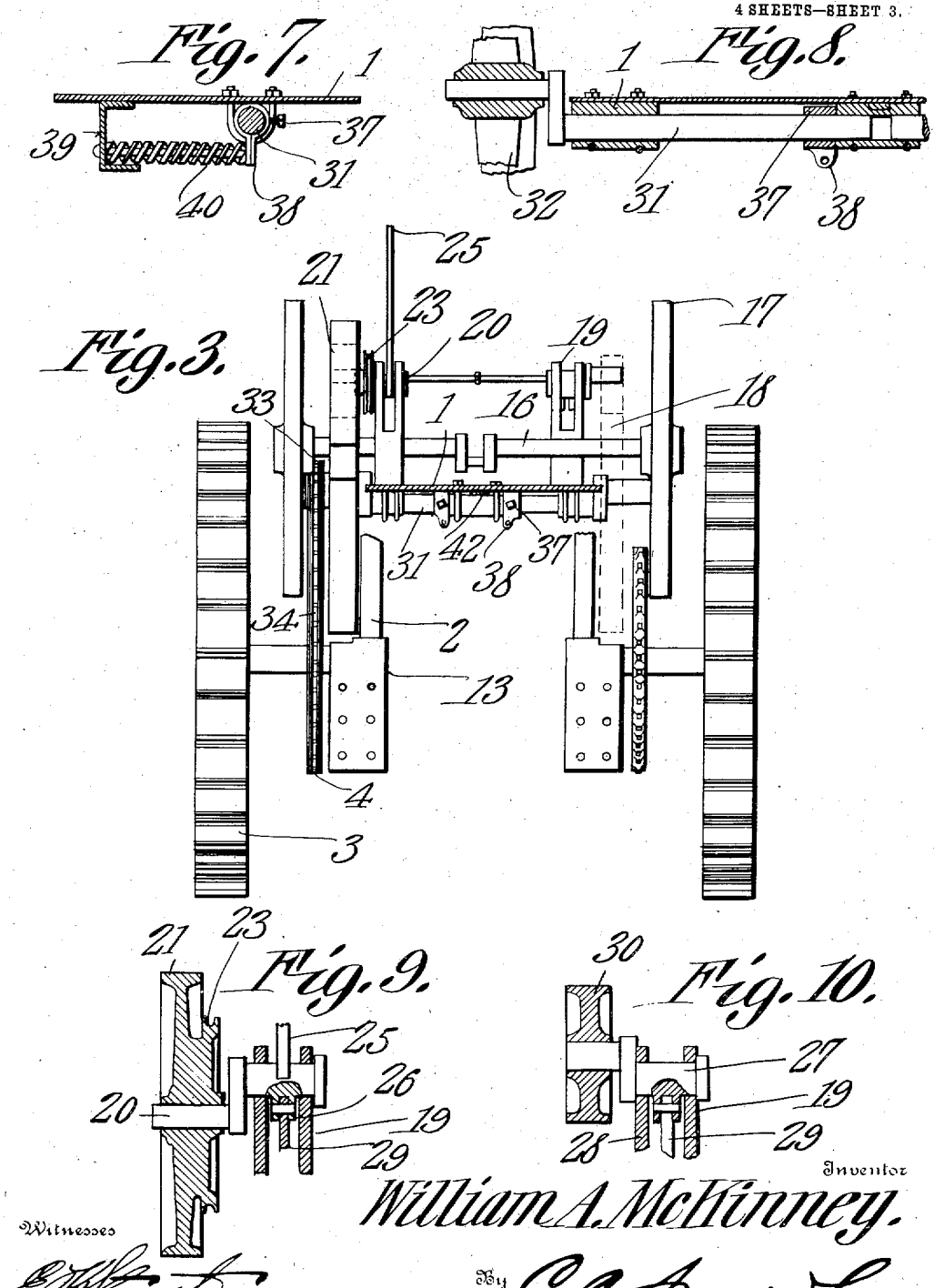
Figure 4:
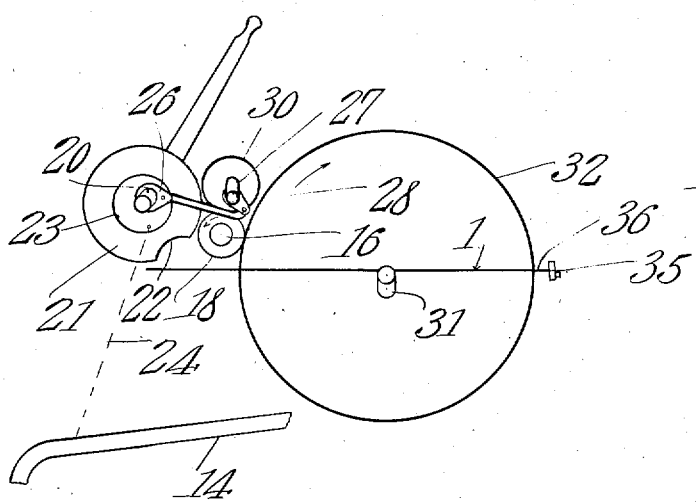
Figure 5:
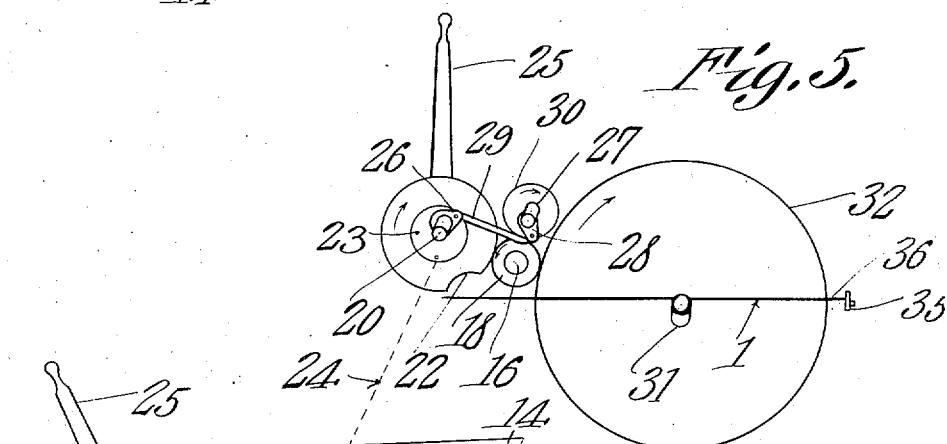
Figure 6:
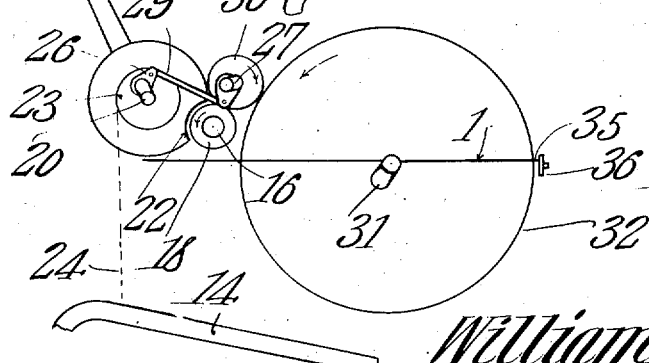

In the accompanying drawing:—Figure 1 is a side elevation of the traction cultivator. Fig. 2 is a top plan view of the same with parts removed and parts broken away. Fig. 3 is a transverse sectional view of the same. Fig. 4 is a diagrammatic view of a motion transmitting device used upon the cultivator showing the parts thereof in one position. Fig. 5 is a diagrammatic view of the means illustrated in Fig. 4 showing the parts thereof in another position. Fig. 6 is a diagrammatic view of the means illustrated in Fig. 4 showing the parts in still another position. Fig. 7 is a detailed sectional view of a spring mechanism used upon the cultivator for holding a crank shaft employed thereon in a normal position. Fig. 8 is a detailed sectional view of the crank shaft which is operated upon by the means shown in Fig. 7. Fig. 9 is a transverse sectional view of a disk for elevating the cultivator beam and the shaft upon which it is mounted. Fig. 10 is a transverse sectional view of a friction roll and crank shaft used upon the cultivator. Fig. 11 is an edge elevation with parts in section of a lever mechanism used upon the cultivator for controlling the traction wheels thereof.

The cultivator includes a platform 1 which is mounted upon an arch axle 2. Traction wheels 3 are journaled for rotation at the ends of the axle 2 and are provided upon their inner sides with sprocket rims 4. A beam 5 extends rearwardly from the platform 1 and at one side thereof and its rear end is provided with a vertically disposed sleeve or bearing 6. A caster bracket 7 is journaled in the sleeve 6 and a wheel 8 is journaled in the bracket 7. The upper end of the shank 9 of the bracket 7 projects above the upper end of the sleeve 6 and a tiller 10 is fixed to the said shank 9 above the upper end of the sleeve. A handle 11 is fixed to the forward end of the tiller 10 and is located within convenient reach of one occupying the operator seat 12 the said seat in turn being mounted upon the rear portion of the platform 1. The plates 13 are fixed to the inner horizontal portions of the ends of the arch axle 2 and cultivator beams 14 are pivotally connected at their forward ends by any suitable means to the said plates 13.

An engine 15 is mounted upon the platform 1 and is provided with the usual crank shaft 16. The shaft 16 extends transversely across the platform and its ends project beyond the sides of the said platform. Fly wheels 17 are fixed to the ends of the crank shaft and the shaft is provided at its opposite end portions with friction rolls 18. Frames 19 are mounted upon the platform 1 at the sides thereof and the end portions of the shaft 16 lie under the intermediate portions of the said frames. Stub-crank shafts 20 are journaled at the rear portions of the frames 19 and upon their cranks are journaled friction rolls 21. The said rolls have in their peripheries gaps or recesses 22 the object of which will be hereinafter explained. Grooved disks or drums 23 are fixed concentrically with relation to the rolls 21 and the upper ends of the chains 24 are attached to the peripheries of the said disks or drums 23 while the lower ends of the said chains 24 are attached to the rear portions of the cultivator beams 14. Levers 25 are fixed to the journaled portions of the stub-crank shaft 20 and lugs 26 are also fixed to the journaled portions of the said stub-crank shafts.

Stub-crank shafts 27 are journaled at the forward end portions of the frames 19 and lugs 28 are fixed to the journaled portions of the stub-crank shafts 27. Connecting rods 29 are pivoted at their rear end to the lugs 26 and at their forward end to the lugs 28. Friction rolls 30 are journaled upon the cranks of the stub-shaft 27. Counter crank shafts 31 are journaled for rotation at the opposite sides of the forward portion of the platform 1 and friction wheels 32 are journaled upon the cranks of the said shaft 31. Sprocket wheels 33 are fixed in concentric relation with the friction wheels 32 and sprocket chains 34 are passed around the sprocket rims 4 and sprocket wheels 33. Arms 35 project forwardly from the upward portion of the platform 1 and extend around in front of the wheels 32. At their forward ends the arms 35 carry brake shoes 36 which are located in the paths of movement of the wheels 32 and are adapted to be engaged by the said wheels in a manner hereinafter to be explained.

Collars 37 are fixed to the inner ends of the counter shafts 31 and are provided with downwardly projecting lugs 38. Stops 39 are fixed to the under side of the platform 1 behind the shaft 31 and expansion springs 40 are interposed between the said stops 39 and lugs 38. A pin is fixed to the platform 1 and a bar 42 is provided at the forward end with an elongated opening 43 which receives the said pins 41. The bar 42 extends rearwardly under the platform 1 and at its forward portion is provided with a cross piece 44 which bears against the front surface of the lugs 38.

A handle 45 is pivotally attached to the rear end of the bar 42 at the point 46 (which is in the vicinity of the rear ends of the platform 1) and the rear end of the said handle 45 lies within convenient reach of one occupying the seat 12. The tension of the spring 40 operating upon the shafts 31 through the sleeve 37 and lugs 38 normally hold the said shaft so that the peripheries of the wheels 32 are out of engagement with the brake shoes 36 and inasmuch as the wheels 32 are connected with the traction wheels 3 by means of the sprocket wheels 33, sprocket rims 4 and sprocket chains 34; as the said wheels 32 rotate so will the sprocket wheels 3. The peripheries of the wheels 32 are thus normally held in engagement with the peripheries of the friction rolls 8 upon the engine shaft 16. Thus as the said shaft rotates rotary movement is transmitted frictionally to the wheels 32. When the cultivator is moving in a forward direction the movement transmitting parts are in the relative position as illustrated in Fig. 4 in which view it will be seen that the friction roll 21 is out of engagement with the periphery of the friction roll 18 and consequently the cultivator beam 14 is in its lowermost position. The friction roll 30 is not in contact with the friction roll 18 and consequently the roll 30 does not rotate upon its axis and is not in contact with the periphery of the roll 21 or that of the wheel 32.

Presuming now that it is desired to raise the cultivator beam at one side of the tractor without that at the other side. The lever 25 is swung from the position shown in Fig. 4 to that shown in Fig. 5. Thus the shaft 20 is partially rotated upon its axis and the lug 26 is rotated about the axis of the said shaft. This movement on the part of the lug 26 moves the connecting rod 29 longitudinally which in turn rotates the lug 28 about the axis of the shaft 27 whereby the friction roll 30 is moved above the periphery of the roll 18 toward the periphery of the wheel 32 but not to such an extent as to come in contact with the periphery of the wheel 32. At the same time the friction roll 21 is carried toward and in contact with the periphery of the friction roll 18 and as the said roll 18 is rotating as above described the roll 21 is rotated until the gap 22 comes around and receives the outer portion of the periphery of the roll 18. Inasmuch as the drum 23 is fixed to the friction roll 21 the chain 24 is wound upon the said drum and the cultivator beam 14 is swung up. It is of course understood that should it be desired to raise the cultivator beam at the other side of the tractor said lever 25 at the opposite side of the tractor is manipulated in the manner just above described. After the beams at both sides of the tractor have been raised should it be desired to cause the tractor to move in a backward direction or the traction wheel at one side to rotate in a backward direction while that at the other side is at rest or rotating in a forward direction; that lever 25 at the side of the tractor which it is desired to move in a backward direction is swung from the position indicated in Fig. 5 to that indicated in Fig. 6 (which may be done by reason of the fact that the gap 22 is at the periphery of the friction roll 18). When this is done the shaft 20 rotates still farther upon its axis and the lug 26 is carried around the axis of the said shaft so that the rod 29 is moved longitudinally and through the lug 28 the shaft 27 is partially rotated whereby the periphery of the friction roll 30 is brought in contact with the periphery of the friction wheel 32 and roll 18 and the said wheel 32 is forced away from the periphery of the friction roll 18 inasmuch as the shaft 31 may turn in its bearing against the tension of the spring 40. Thus instead of rotary movement being transmitted directly from the disk 18 to the wheel 32 it is transmitted from the roll 18 to the roll 30 and to the wheel 32. Thus it will be seen that the traction wheel at one or both sides of the tractor cannot rotate in a rearward direction until after the cultivator beam or beams have been raised.

It is of course understood that in order to cause the traction wheel at the other side of the machine to rotate in a rearward direction it is necessary to manipulate the lever 25 at the other side of the cultivator in the manner just above described. The said levers at the opposite sides of the tractor may be manipulated simultaneously or at different times as may be required.

At times it is desirable to cause the tractor to affect or make a short turn as for instance at the end of a row and this may be accomplished by bringing the handle 45 to one side or the other which will cause the bar 42 to swing laterally upon the pin 41. As the said bar 42 is swung as indicated one end of the cross piece 44 will move away from one of the lugs 38 while the other end will move toward the other lug of the collar 37. The lugs toward which the end of the cross piece 44 moves is forced back against the tension of the spring 40 bearing against the said lug and the counter shaft 31 carrying the lug is partially rotated whereby the friction wheel 32 is moved out of engagement with that friction roll 18 adjacent the same. Thus on the initial movement of the handle 45 one or the other of the friction wheel 32 is stopped in its rotation and should it be desired to lock the said friction wheel 32 in a state of rest the lateral swing of the handle 45 is continued which through the connecting parts will force the periphery of the stopped friction wheel 32 in contact with the shoe 36 at the end of the arm 35. Thus as one of the traction wheels is checked or interrupted in its rotation while the other is permitted to continue in its rotation the tractor will effect a short turn upon the periphery of the stopped traction wheel as an axis.

When it is desired to stop the rotation of both traction wheels at the same time the handle 45 is swung vertically and when its upper portion comes in contact with the rear edge of the platform 1 the said edge serves as a fulcrum and the handle 45 becomes a lever whereby the bar 42 is moved longitudinally until the forward end of the slot 43 comes in contact with the forward side of the pin 41. As the said bar 42 moves rearwardly the cross piece 44 is carried back and engages both lugs 38 and turns both of the shafts 31. Thus both of the friction wheels 32 are moved away from the peripheries of the friction rollers 18 and if desired the said friction wheels 32 may be moved into engagement with the brake shoes 36.

While in many instances it is desirable to operate the lever 25 at one side of the tractor without disturbing the lever at the other side still in some cases it is desirable (in their initial movement at least) that both levers be operated simultaneously. To accomplish this the lever 47 is fulcrumed upon the platform 1 and is connected by means of links 48 with the lever 25. The lever 47 has sufficient movement when swung to cause the levers 25 to move to such an extent as to elevate the cultivator beams 14 and the links possess sufficient flexibility to permit of the final movement of either of the levers 25 to reverse the rotation of the traction wheels from a forward direction to a rear direction.

As the cultivator moves along a row of plants, it may be accurately guided in its course by an operator manipulating the tiller 10 whereby the caster wheel 8 serves as a steering wheel.

Having described my invention, what I claim as new and desire to secure by Letters-Patent is:

1. A tractor comprising a frame, wheels journaled for independent rotation at the opposite sides thereof, an engine mounted upon the frame, separate means located at the opposite sides of the frame for transmitting movement from the engine to the wheels independently, and means for independently reversing the movement of said transmitting means.

2. A tractor comprising a frame, wheels located at the opposite sides thereof, and journaled for independent rotation, an engine mounted upon the frame, independent means located at the opposite sides of the frame for transmitting movement from the engine to the wheels independently, means for reversing the movement of each transmitting means, and means for interrupting the rotation of one of the wheels while the other is in rotation.

3. A tractor comprising a frame, wheels journaled for independent rotation at the opposite sides thereof, an engine mounted upon the frame, transmission means located at the opposite sides of the frame and adapted to transmit motion from the engine to the wheels independently, said transmission means being susceptible of independent manipulation to cause the wheels to rotate independently in either of two directions or to bring the wheels to a state of rest.

4. A tractor comprising a frame, wheels journaled for independent rotation at the opposite sides thereof, an engine mounted upon the frame, spring retained counter shafts journaled upon the frame, friction means for transmitting movement from the engine shaft to the counter shafts, means for transmitting movement from the respective counter shafts to the wheels, and means for moving the counter shafts independently against the tension of their springs to interrupt the frictional connection between the engine shaft and the counter shaft.

5. A tractor comprising a frame, wheels journaled for independent rotation at the opposite sides thereof, an engine mounted upon the frame, spring retained counter shafts journaled for rotation upon the frame, said counter shafts having cranks, friction wheels journaled upon the cranks, and frictionally connected with the engine shaft, means for transmitting movement from the friction wheels to the respective wheels located at the opposite sides of the frame, and means for moving the counter shafts independently against their retaining springs to interrupt the frictional connection between the friction wheels and the engine shaft.

6. A tractor comprising a frame, wheels journaled for independent rotation at the opposite sides thereof, an engine mounted upon the frame, counter shafts journaled for rotation upon the frame, means frictionally connecting the counter shafts with the engine shafts, means for transmitting movement from the counter shafts to the respective supporting wheels, means for operating the counter shafts and adapted to be manipulated to cause one or the other to move to interrupt the frictional connection between the said counter shafts and the engine shafts, said means being susceptible of manipulation whereby both counter shafts may be moved simultaneously.

7. A tractor comprising a frame, wheels journaled for independent rotation at the opposite sides of the frame, an engine mounted upon the frame, separate means located at the opposite sides of the frame for operatively connecting the engine with said wheels and means adapted to be operated to lock one wheel against rotation while the other is free to rotate or to lock both wheels simultaneously.

In testimony that I claim the foregoing as my own, I have hereto affixed my signature in the presence of two witnesses.

WILLIAM A. McKINNEY.

Witnesses:
R. J. SANDERS,
J. B. LANDERS.